(12) United States Patent
Qin et al.

(10) Patent No.: US 8,652,250 B2
(45) Date of Patent: Feb. 18, 2014

(54) COMPOSITION USED FOR HIGH-STRENGTH AND IMPERMEABLE CONCRETE

(76) Inventors: Shengyi Qin, Beijing (CN); Yihai Jia, Beijing (CN); Zhenbang Wang, Beijing (CN); Huan Wang, Beijing (CN); Wenxing Hu, Beijing (CN)

( * ) Notice: Subject to any disclaimer, the term of this patent is extended or adjusted under 35 U.S.C. 154(b) by 0 days.

(21) Appl. No.: 13/701,179

(22) PCT Filed: Sep. 9, 2010

(86) PCT No.: PCT/CN2010/076765
§ 371 (c)(1),
(2), (4) Date: Jan. 16, 2013

(87) PCT Pub. No.: WO2011/150608
PCT Pub. Date: Dec. 8, 2011

(65) Prior Publication Data
US 2013/0104777 A1    May 2, 2013

(30) Foreign Application Priority Data
May 31, 2010 (CN) .......................... 2010 1 0195459

(51) Int. Cl.
C04B 20/10 (2006.01)
C04B 28/00 (2006.01)
B22C 1/00 (2006.01)

(52) U.S. Cl.
USPC ........... 106/737; 106/705; 106/706; 106/708; 106/724; 106/803; 106/812; 106/817

(58) Field of Classification Search
USPC ......... 106/737, 817, 705, 706, 708, 724, 803, 106/812
See application file for complete search history.

(56) References Cited

U.S. PATENT DOCUMENTS

| | | | |
|---|---|---|---|
| 3,935,339 A | 1/1976 | Cooke, Jr. | |
| 4,660,642 A * | 4/1987 | Young | 166/280.2 |
| 2008/0271643 A1* | 11/2008 | Ramirez Tobias | 106/666 |

FOREIGN PATENT DOCUMENTS

| | | |
|---|---|---|
| CN | 1083752 | 3/1994 |
| CN | 1345703 | 4/2002 |
| CN | 101016205 | 8/2007 |
| CN | 101649592 | 2/2010 |
| CN | 101987786 | 3/2011 |

OTHER PUBLICATIONS

Liu, Rixin et al.; Application of Waste Water Glass Foundry Sand in Concrete. Foundry. Dec. 2006, vol. 55, No. 11, pp. 1203-1205, English abstract.
International Search Report for corresponding International Application No. PCT/CN2010/076765 mailed Mar. 17, 2011 and English translation thereof.
Written Opinion of the International Searching Authority for corresponding International Application No. PCT/CN2010/076765 mailed Mar. 17, 2011 and English translation thereof.
International Preliminary Report on Patentability for corresponding International Application No. PCT/CN2010/076765 mailed Aug. 31, 2011 and partial English translation thereof.
Li Man Kit et al., Design and test in impermeable concrete mix proportion, China Exploration Engineering, Series No. 104, pp. 22-23 Jan. 2005, English abstract.
Ping et al., Study on Cracking Resistance and Watertight Concrete, Xibei Nuclear Technology Institute, pp. 1-4, Dec. 2011, English abstract.
Chen et al., Using nonmental mineral to make waterproofing and heat insulating materials of the houses' surface, Material Science and Engineering Department of East China Institute of Technology, pp. 31-33, Jun. 2003, English abstract at p. 33.
Office Action for corresponding Chinese Application No. 201010195459.3, mailed Jun. 21, 2013.

\* cited by examiner

*Primary Examiner* — Anthony J Green
(74) *Attorney, Agent, or Firm* — Calfee, Halter & Griswold LLP

(57) ABSTRACT

A composition used for high-strength impermeable concrete. The composition contains sand, stone, cement, water reducer, water and reinforced impermeable sand. The reinforced impermeable sand includes aeolian sand and binder covering the surface of the aeolian sand. The reinforced impermeable sand can fill the gap between the sand and the stone, and well combine various components in the composition, and suppress the seepage phenomenon of the molded concrete, thereby greatly improving the strength and impermeability of the concrete.

18 Claims, No Drawings

COMPOSITION USED FOR HIGH-STRENGTH AND IMPERMEABLE CONCRETE

This application is a national phase of International Application No. PCT/CN2010/076765 filed Sep. 9, 2010, which claims priority to Chinese Patent Application No. 201010195459.3, filed May 31, 2010.

FIELD OF THE INVENTION

The present invention relates to the field of building materials, more specifically, relates to a composition used for high-strength impermeable concrete.

BACKGROUND OF THE INVENTION

Concrete is one of the most important civil engineering materials today. It is characterized by abundant raw material, low price and simple production process as well as high compressive strength, high durability and a wide range of strength grades, so it is widely used in various civil works.

Ordinary concrete is an artificial stone material formed after hardening of the mixture of cement, sand, stone, admixture and water. Sand and stone play a role of framework in concrete and inhibit the contraction of cement. Cement and water form cement paste, which covers the surface of sand and stone and fill the gap between the sand and the stone. Before hardening, cement paste plays a lubricating role and makes concrete mixture have desirable workability. After hardening, it cements the aggregate which plays a role of framework to form a firm body. Ordinary concrete has certain workability, strength, deformation and durability.

However, in the recent years, following the development of the construction industry, the requirements on building materials are getting stricter, particularly on concrete which has the widest use among building materials. Ordinary concrete can no longer meet the requirements of modern buildings on strength and impermeability. Although many kinds of novel concrete keep emerging, their strength and impermeability are still low and need to be improved further.

SUMMARY OF THE INVENTION

In order to overcome the low strength and impermeability of the prior art, the object of the present invention is to provide a new-type composition used for concrete which has high strength and good impermeability.

The present invention provides a composition used for high-strength impermeable concrete, the composition contains sand, stone, cement, water reducer and water, wherein the composition also contains reinforced impermeable sand, which includes aeolian sand and binder covering the surface of the aeolian sand.

In the present invention, by adding reinforced impermeable sand obtained from aeolian sand with surface modified and covered with binder to a composition used for concrete which contains sand, stone, cement, water reducer and water, the gap between the sand and the stone can be filled in a desirable way and all components of the composition are effectively combined, and the seepage phenomenon of the molded concrete is suppressed, thereby greatly improving the strength and impermeability of concrete. For example, the effect of Examples 1-5 of the present invention indicates the concrete made from the composition used for high-strength impermeable concrete provided by the present invention can achieve 100 MPa of compressive strength and 13 MPa of breaking strength, and the impermeability grade may reach P38.

DETAILED DESCRIPTION OF THE EMBODIMENTS

The present invention provides a composition used for high-strength impermeable concrete, the composition contains sand, stone, cement, water reducer and water, wherein the composition also contains reinforced impermeable sand, which includes aeolian sand and binder covering the surface of the aeolian sand.

Preferably, on the basis of the total weight of the composition, the content of the reinforced impermeable sand may be 1-10 wt %. More preferably, on the basis of the total weight of the composition, the content of the sand may be 10-35 wt %, the content of the stone may be 20-60 wt %, the content of the cement may be 10-30 wt %, the content of the water reducer may be 0.05-1 wt % and the content of the water may be 10-15 wt %. Still more preferably, the content of the sand may be 15-30 wt %, the content of the stone may be 30-50 wt %, the content of the cement may be 15-25 wt %, the content of the water reducer may be 0.1-1 wt %, the content of the reinforced impermeable sand may be 2-8 wt % and the content of the water may be 11-14 wt %. When the content of every component of the composition used for high-strength impermeable concrete provided by the present invention is in the foregoing preferable range, it can be assured that the concrete will have more desirable workability, strength, deformation and durability.

In the composition used for high-strength impermeable concrete according to the present invention, the preferred aeolian sand is the aeolian sand naturally formed in the desert, and the reinforced impermeable sand may be obtained by washing with water, drying and calcining the aeolian sand and then covering it with binder. Preferably, before washing with water, aeolian sand with a particle size of 75-850 µm is selected with a sieve. Then the dirt in the aeolian sand is washed away with water. After dried at 80-150° C., the aeolian sand is transferred to a calcining furnace and calcined at 200-2000° C. for 2-5 h. After calcining, it is cooled to 80-400° C. at a cooling speed of 25-650° C./h. Then it is transferred to a sand mixer. Binder is added and mixed evenly to obtain reinforced impermeable sand covered with binder. Alternatively, after mixing evenly, a curing agent may be further added and stirred 5-15 min to obtain reinforced impermeable sand. The curing agent may be a conventional curing agent in the art, such as: A-stage phenolic resin, and so on. Relative to 100 parts by weight of binder, the preferred amount of the curing agent is 10-50 parts by weight. Calcining aeolian sand at 200-2000° C., on the one hand may remove the impurities on its surface and on the other hand during heating and calcining, phase transition happens to the quartz of aeolian sand (reversible transition from $\alpha$ to $\beta$ at 573° C., irreversible transition from $\beta$ to $\gamma$ at 870° C.), so the strength of aeolian sand may be improved significantly.

In the composition used for high-strength impermeable concrete according to the present invention, the average particle size of the reinforced impermeable sand may be 45-850 µm, preferably 50-200 µm, more preferably 75 µm. The average particle size of the reinforced impermeable sand may be measured by various common particle size testers. For example, it may be measured by a particle size sieve (standard sieve). The average particle size in the foregoing range helps the reinforced impermeable sand fill the gap of concrete in a better way and makes the concrete more compact. The average particle strength of the reinforced impermeable sand may be 20-60N, preferably 30-50N. The average particle strength of the untreated sand as described in the present invention, such as: aeolian sand, is typically 15-30N. The average particle strength of the reinforced impermeable sand may be measured by the following method for example: randomly select 30 sand particles, use a microcomputer controlled electronic universal testing machine (CMT4204, Shenzhen Sans Material Test Instruments Co., Ltd.) to test the maximum pressure endurable to the sand particles and choose the average value as average particle strength. The particle strength in the foregoing range helps improve the strength of concrete. The sphericity of the reinforced impermeable sand may be 0.5-0.8, preferably 0.6-0.8. The sphericity of the reinforced impermeable sand may be measured in accordance with SY/T5108-2006 Performance Index and the Recommended Test Method of Fracturing Propping Agent and in comparison with the reference sphericity plates. The sphericity in the foregoing range helps reinforced impermeable sand move in the gap of concrete, thereby filling the gap of concrete in a more desirable manner and making the concrete more compact.

In the composition used for high-strength impermeable concrete according to the present invention, the binder may be any binder that can realize the object of the present invention. In order that reinforced impermeable sand plays a better binding role in the gap of concrete and the components of concrete are combined more compactly, preferably the binder may be epoxy resin or phenolic resin. The epoxy resin or phenolic resin may be common epoxy resin or phenolic resin, with a weight-average molecular weight of 300-10000 typically. More preferably, the binder is epoxy resin, with a weight-average molecular weight of 8000-10000, and an epoxy value of 0.4-0.6 eq/100 g. The epoxy resin may be epoxy resin E44 (epoxy value 0.41-0.47 eq/100 g), epoxy resin E51 (epoxy value 0.48-0.54 eq/100 g) or epoxy resin E42 (epoxy value 0.38-0.45) produced by Beijing Heli Chemical Co., Ltd. The phenolic resin may be 939P phenolic resin produced by Beijing Heli Chemical Co., Ltd. These resins may be used separately or used in a combined matter. On the basis of the weight of the aeolian sand, the content of the binder may be 0.5-3 wt %, preferably 0.5-1.5 wt %.

In the composition used for high-strength impermeable concrete according to the present invention, the water reducer may be a water reducer typically used in the art. In order to reduce water consumption during mixing and improve concrete strength, preferably the water reducer may be at least one of polycarboxylic acid, polyamide, melamine and naphthalene series high efficiency water reducer. The weight-average molecular weight of the polycarboxylic acid and polyamide may be 6000-45000.

In the composition used for high-strength impermeable concrete according to the present invention, other additives may be contained too, provided that the properties of the composition of the present invention are not affected. For example, it may contain at least one of dispersible rubber powder, silica fume, fly ash, mineral powder and kaolin. The addition of the additives may significantly improve the comprehensive technical performance of concrete, such as: binding strength, compressive strength and breaking strength. All the additives are available in the market. Dispersible rubber powder may be JGB-101 dispersible rubber powder. Silica fume, also known as silica powder. Its main composition is $SiO_2$, it is a byproduct of the smelting of ferrosilicon alloy or industrial silicon, formed from the cold oxidation and cold dust collection of the silicon vapor discharged in form of smoke. The silica fume produced by Beijing Linggan Technology Development Co., Ltd. for example may be used. The fly ash may be the fly ash produced by Beijing Electric Power Fly Ash Industrial Corporation for example. The mineral powder may be the GH mineral powder produced by Beijing Linggan Technology Development Co., Ltd. The kaolin may be the calcined kaolin produced by Beijing Eastern Allhand Co., Ltd. From the perspective of guaranteeing the strength and impermeability of concrete, on the basis of the total weight of the composition, the content of the additives may be 0.5-35 wt %.

In the composition used for high-strength impermeable concrete according to the present invention, the sand may be the untreated natural sand conventional in this field, such as: river sand, sea sand or aeolian sand. They are all available in the market and may be freely selected according to the actual need.

The stone may be conventional stone in this field, with a typical particle size of 5-25 mm. They are available in the market The cement may be conventional silicate cement in the field. Cement may be produced by a conventional method: limestone, clay and iron ore powder is ground and mixed in proportion to obtain raw meal. The raw meal is calcined (normally the temperature is about 1450° C.) to obtain a calcination product (clinker). Then the clinker and plaster are finely ground and mixed in proportion to obtain cement. The cement is available in the market.

The components of the foregoing composition used for high-strength impermeable concrete are mixed and stirred 1-5 min to obtain a composition used for high-strength impermeable concrete.

In respect to the preparation method of the foregoing composition used for high-strength impermeable concrete, there is no specific limitation to mixing and stirring methods. Various existing mixing and stirring methods may be adopted. For example, a common concrete mixer may be adopted for the stirring and mixing. Various types of concrete mixer may be used, such as: 55-C0199 concrete mixer produced by Beijing Newlead Science & Technology Co. Ltd.

Below the present invention is described in more details in connection with examples, but the present invention is not limited to these examples.

In the following examples and comparison examples, sand (river sand, sea sand or aeolian sand) is bought from Beijing Chaoyue Building Material Trading Co., Ltd.; stone are bought from Beijing Chaoyue Building Material Trading Co., Ltd., with a particle size of 2.5-20 mm; cement is bought from Beijing Cement Plant Co., Ltd.; water reducer is KSM-830 polycarboxylic acid high efficiency water reducer bought from Beijing Kaisimei United Chemical Products Co., Ltd.

Preparation Process of Reinforced Impermeable Sand

Aeolian sand is screened to obtain aeolian sand with a particle size of 45-850 μm. The dirt in it is washed away with water. Then it is dried at 120° C. and the average particle strength is measured. It is 20N. The foregoing dried aeolian sand is transferred to a calcining furnace and calcined at 1000° C. for 3 h. After calcining, the temperature is kept 3.5 h. Then it is transferred to a sand mixer and naturally cooled to 200° C. Binder is added and mixed evenly. A-stage phenolic resin (Shanghai Ousheng Chemical Co., Ltd., model 2127) accounting for 20 wt % of the binder is added. After 5-15 min's stirring, the reinforced impermeable sand covered with binder is obtained.

Example 1

This example is intended to explain the composition used for high-strength impermeable concrete provided by the present invention.

The amount of each component is: river sand 50 kg, stone 80 kg, cement 37 kg, reinforced impermeable sand 10 kg, water reducer 1 kg and water 22 kg.

The river sand, stone and cement are added to a concrete mixer (Beijing Newlead Science & Technology Co. Ltd.; model 55-C0199). The mixer is started to carry out dry mixing. After evenly mixing, the reinforced impermeable sand obtained with the foregoing method for preparing reinforced impermeable sand is added. The composition and properties of the reinforced impermeable sand are as shown in Table 1. Stirred continuously till it is evenly, water reducer and water are added. Stirred at 150 r/min for 3 min, obtaining the composition used for high-strength impermeable concrete.

Comparison Example 1

This comparison example is intended to explain the composition used for ordinary concrete in the prior art.

The amount of each component is: river sand 60 kg, stone 80 kg, cement 37 kg, water reducer 1 kg and water 22 kg.

The river sand, stone and cement are added to a concrete mixer (Beijing Newlead Science & Technology Co. Ltd.; model 55-C0199). The mixer is started to carry out dry mixing. After evenly mixing, water reducer and water are added, Stirred at 150 r/min for 3 min, obtaining the composition used for ordinary concrete.

Example 2

This example is intended to explain the composition used for high-strength impermeable concrete provided by the present invention.

The amount of each component is: river sand 20 kg, stone 78 kg, cement 60 kg, reinforced impermeable sand 20 kg, water reducer 2 kg and water 20 kg.

The river sand, stone and cement are added to a concrete mixer (Beijing Newlead Science & Technology Co. Ltd.; model 55-C0199). The mixer is started to carry out dry mixing. After evenly mixing, the reinforced impermeable sand obtained with the foregoing method for preparing reinforced impermeable sand is added. The composition and properties of the reinforced impermeable sand are as shown in Table 1. Stirred continuously till it is evenly, water reducer and water are added. Stirred at 150 r/min for 5 min, obtaining the composition used for high-strength impermeable concrete.

Example 3

This example is intended to explain the composition used for high-strength impermeable concrete provided by the present invention.

The amount of each component is: river sand 70 kg, stone 77.9 kg, cement 20 kg, reinforced impermeable sand 2 kg, water reducer 0.1 kg and water 30 kg.

The river sand, stone and cement are added to a concrete mixer (Beijing Newlead Science & Technology Co. Ltd.; model 55-C0199). The mixer is started to carry out dry mixing. After evenly mixing, the reinforced impermeable sand obtained with the foregoing method for preparing reinforced impermeable sand is added. The composition and properties of the reinforced impermeable sand are as shown in Table 1. Stirred continuously till it is evenly, water reducer and water are added. Stirred at 150 r/min for 1 min, obtaining the composition used for high-strength impermeable concrete.

Example 4

This example is intended to explain the composition used for high-strength impermeable concrete provided by the present invention.

The amount of each component is: river sand 50 kg, stone 80 kg, cement 37 kg, reinforced impermeable sand 10 kg, silica fume 1 kg, water reducer 1 kg and water 21 kg.

The river sand, stone and cement are added to a concrete mixer (Beijing Newlead Science & Technology Co. Ltd.; model 55-C0199). The mixer is started to carry out dry mixing. After evenly mixing, the reinforced impermeable sand obtained with the foregoing method for preparing reinforced impermeable sand as well as silica fume (purchased from Dalian Qiannian Mining Co., Ltd.) are added. The composition and properties of the reinforced impermeable sand are as shown in Table 1. Stirred continuously till it is evenly, water reducer and water are added. Stirred at 150 r/min for 3 min, obtaining the composition used for high-strength impermeable concrete Example 5

This example is intended to explain the composition used for high-strength impermeable concrete provided by the present invention.

The amount of each component is: river sand 30 kg, stone 40 kg, cement 29 kg, reinforced impermeable sand 10 kg, kaolin 70 kg, water reducer 1 kg and water 20 kg.

The river sand, stone and cement are added to a concrete mixer (Beijing Newlead Science & Technology Co. Ltd.; model 55-C0199). The mixer is started to carry out dry mixing. After evenly mixing, the reinforced impermeable sand obtained with the foregoing method for preparing reinforced impermeable sand as well as kaolin (purchased from Beijing Lanning Co., Ltd.) are added. The composition and properties of the reinforced impermeable sand are as shown in Table 1. Stirred continuously till it is evenly, water reducer and water are added. Stirred at 150 r/min for 3 min, obtaining the composition used for high-strength impermeable concrete

TABLE 1

Composition and properties of the reinforced impermeable sand

|  | Example 1 | Example 2 | Example 3 | Example 4 | Example 5 |
|---|---|---|---|---|---|
| Type of binder (epoxy resin model) | E-51 | E-44 | E-42 | E-44 | E-44 |
| Binder/aeolian sand (weight ratio) | 1:100 | 1.2:100 | 1.5:100 | 0.5:100 | 0.8:100 |
| Properties of reinforced impermeable sand: |  |  |  |  |  |
| Average particle size (μm) | 106 | 150 | 75 | 300 | 212 |
| Average particle strength | 40N | 42N | 50N | 35N | 55N |
| Sphericity | 0.6 | 0.7 | 0.6 | 0.7 | 0.6 |

Performance Testing of Concrete
1. Testing of Compressive Strength and Breaking Strength of Concrete The test is performed according to GB/T 50081-2002 Testing Methods for Mechanical Performance of Ordinary Concrete.

2. Concrete Impermeability Grade Test

The test is performed according to GBJ82-85 Testing Methods for Long Term Properties and Durability of Ordinary Concrete.

Examples 6-10

The composition used for concrete is obtained from Examples 1-5 and cured in a standard curing box for 28 days. The compressive strength, breaking strength and impermeability grade are measured by the foregoing concrete property test methods. The test result is as shown in Table 2.

Comparison Example 2

The composition used for concrete is obtained from Comparison example 1 and cured in a standard curing box for 28 days. The compressive strength, breaking strength and impermeability are measured by the foregoing concrete property test methods. The test result is as shown in Table 2.

TABLE 2

|  | Example 6 | Example 7 | Example 8 | Example 9 | Example 10 | Comparison example 2 |
| --- | --- | --- | --- | --- | --- | --- |
| Compressive strength (MPa) | 80 | 71 | 100 | 98 | 75.6 | 38.4 |
| Breaking strength (MPa) | 10 | 8 | 13 | 11.5 | 9.2 | 5 |
| Impermeability grade | 35 | 33 | 38 | 38 | 36 | 14 |

The data in Table 2 indicate the compressive strength of high-strength impermeable concrete of the present invention is as high as 100 MPa, the breaking strength is as high as 13 MPa and the permeability grade may reach P38. Compared with the ordinary concrete in the prior art, it has higher strength and impermeability.

What is claimed is:

1. A composition used for high-strength impermeable concrete, which contains sand, stone, cement, water reducer and water, characterized in that the composition also contains reinforced impermeable sand, which includes aeolian sand and binder covering the surface of the aeolian sand, wherein the average particle strength of the reinforced impermeable sand is 20-60 N.

2. The composition according to claim 1, wherein on the basis of the total weight of the composition, the content of the reinforced impermeable sand is 1-10 wt %.

3. The composition according to claim 2, wherein on the basis of the total weight of the composition, the content of the sand is 10-35 wt %, the content of the stone is 20-60 wt %, the content of the cement is 10-30 wt %, the content of the water reducer is 0.05-1 wt % and the content of the water is 10-15 wt %.

4. The composition according to claim 1, wherein the reinforced impermeable sand is obtained by washing with water, drying and calcining the aeolian sand and then coating it with binder.

5. The composition according to claim 4, wherein the calcining conditions include: calcining temperature is 200-2000° C. and calcining time is 2-5 h.

6. The composition according to claim 1, wherein the average particle size of the reinforced impermeable sand is 45-850 μm.

7. The composition according to claim 1, wherein the sphericity of the reinforced impermeable sand is 0.5-0.8.

8. The composition according to claim 1, wherein the binder is epoxy resin or phenolic resin, and on the basis of the weight of the aeolian sand, the content of the binder is 0.5-3 wt %.

9. The composition according to claim 1, wherein the water reducer is at least one of polycarboxylic acid, polyamide, melamine and naphthalene series water reducer.

10. The composition according to claim 1, wherein the composition also contains additives, which is at least one of dispersible rubber powder, silica fume, fly ash, mineral powder and kaolin.

11. The composition according to claim 10, wherein on the basis of the total weight of the composition, the content of the additives is 0.5-35 wt %.

12. The composition according to claim 2, wherein the reinforced impermeable sand is obtained by washing with water, drying and calcining the aeolian sand and then coating it with binder.

13. The composition according to claim 12, wherein the calcining conditions include: calcining temperature is 200-2000° C. and calcining time is 2-5 h.

14. The composition according to claim 2, wherein the average particle size of the reinforced impermeable sand is 45-850 μm.

15. The composition according to claim 2, wherein the sphericity of the reinforced impermeable sand is 0.5-0.8.

16. The composition according to claim 2, wherein the binder is epoxy resin or phenolic resin, and on the basis of the weight of the aeolian sand, the content of the binder is 0.5-3 wt %.

17. The composition according to claim 2, wherein the water reducer is at least one of polycarboxylic acid, polyamide, melamine and naphthalene series water reducer.

18. The composition according to claim 2, wherein the composition also contains additives, which is at least one of dispersible rubber powder, silica fume, fly ash, mineral powder and kaolin.

* * * * *